US011720977B2

(12) United States Patent
Zubenko et al.

(10) Patent No.: US 11,720,977 B2
(45) Date of Patent: Aug. 8, 2023

(54) WORK TRACKING AND ADVANCES IN AN EMPLOYEE DATABASE SYSTEM

(71) Applicant: ZenPayroll, Inc., San Francisco, CA (US)

(72) Inventors: Roman Zubenko, San Francisco, CA (US); Sahil Jolly, San Francisco, CA (US); Phan Anh Le, Walnut Creek, CA (US); William Newton, San Francisco, CA (US); Omar Skalli, San Francisco, CA (US); Kevin Hyunil Kim, San Francisco, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 0 days.

(21) Appl. No.: 17/572,499

(22) Filed: Jan. 10, 2022

(65) Prior Publication Data

US 2022/0129994 A1  Apr. 28, 2022

Related U.S. Application Data

(63) Continuation of application No. 16/426,669, filed on May 30, 2019, now Pat. No. 11,257,169.

(51) Int. Cl.
*G06Q 40/12* (2023.01)
*G06Q 10/1091* (2023.01)

(52) U.S. Cl.
CPC ....... *G06Q 40/125* (2013.12); *G06Q 10/1091* (2013.01)

(58) Field of Classification Search
CPC ...... G06Q 20/40; G06Q 20/405; G06Q 20/10; G06Q 10/1057; G06Q 40/125;
(Continued)

(56) References Cited

U.S. PATENT DOCUMENTS

| | | | | |
|---|---|---|---|---|
| 10,055,716 B2 * | 8/2018 | Cacheria, III | ....... | G06Q 40/125 |
| 10,268,992 B2 * | 4/2019 | Cacheria, III | ......... | G06Q 20/04 |
| 10,339,608 B1 * | 7/2019 | Haitz | ................... | G06Q 40/125 |

(Continued)

OTHER PUBLICATIONS

Innovation, Science and Economic Development Canada, Canadian Intellectual Property Office, Office Action, Canadian Patent Application 3,045,028, dated Feb. 4, 2021, six pages.
(Continued)

*Primary Examiner* — Olusegun Goyea
(74) *Attorney, Agent, or Firm* — Fenwick & West LLP (57) ABSTRACT

A flexible advance system allows users to request and receive advances. The flexible advance system processes advances such that short-term advances are repaid through a wage deduction from the user's next regularly scheduled compensation period. The flexible advance system provides a user interface that allows users to request to receive compensation for a portion of time worked. Responsive to a request, an entry in a database associated with the user is accessed to determine a total amount of available advance compensation available for request by the user. In response to the requested amount being less than the total amount of available advance compensation, a transfer of compensation is executed to an account of the user. The flexible advance system also modifies the entry in the database by subtracting the compensated amount of time from the total amount of uncompensated time.

20 Claims, 5 Drawing Sheets

(58) Field of Classification Search
CPC .... G06Q 20/401; G06Q 40/025; G06Q 40/02; G06Q 40/12
USPC .......................... 705/30, 31, 38, 40; 235/377
See application file for complete search history.

(56) References Cited

U.S. PATENT DOCUMENTS

| | | | | |
|---|---|---|---|---|
| 10,572,862 | B2* | 2/2020 | Robinson | G06Q 20/10 |
| 10,679,303 | B1* | 6/2020 | Aaron | G06Q 20/10 |
| 10,810,558 | B2* | 10/2020 | Cacheria, III | G06Q 30/0601 |
| 10,867,358 | B2* | 12/2020 | Cronin | G06Q 20/405 |
| 11,004,155 | B2* | 5/2021 | Shnyr | G06Q 40/125 |
| 11,094,020 | B1* | 8/2021 | Lee | G06Q 40/125 |
| 2001/0034676 | A1* | 10/2001 | Vasic | G06Q 10/10 |
| | | | | 705/30 |
| 2007/0168274 | A1* | 7/2007 | Taylor | G06Q 40/02 |
| | | | | 705/36 T |
| 2009/0127328 | A1* | 5/2009 | Aissa | G10L 17/00 |
| | | | | 235/377 |
| 2012/0054088 | A1* | 3/2012 | Edrington | G06Q 40/03 |
| | | | | 705/38 |
| 2014/0214637 | A1* | 7/2014 | Pai | G06Q 40/123 |
| | | | | 705/31 |
| 2016/0026981 | A1* | 1/2016 | Collins | G06Q 40/12 |
| | | | | 705/40 |
| 2016/0086261 | A1* | 3/2016 | Shah | G06Q 10/105 |
| | | | | 705/38 |
| 2016/0371661 | A1* | 12/2016 | Shah | G06Q 20/4015 |
| 2019/0251528 | A1* | 8/2019 | Cacheria, III | G06Q 20/10 |

OTHER PUBLICATIONS

United States Office Action, U.S. Appl. No. 16/426,669, filed Sep. 9, 2021, 13 pages.

\* cited by examiner

| April 2019 | | | | | | |
|---|---|---|---|---|---|---|
| Sunday | Monday | Tuesday | Wednesday | Thursday | Friday | Saturday |
| | 1<br>420A | 2<br>420B | 3<br>420C | 4<br>420D | 5<br>420E | 6 |
| 7 | 8<br>420F | 9<br>420G | 10<br>Request Advance<br>415 | 11 | 12<br>Payroll 1<br>405 | 13 |
| 14 | 15 | 16 | 17 | 18 | 19 | 20 |
| 21 | 22 | 22 | 24 | 25 | 26<br>Payroll 2<br>410 | 27 |
| 28 | 29 | 30 | | | | |

Provide a user interface for user request to receive compensation for a portion of time worked 505

Access an entry in a database associated with the user 510

Compute a total amount of compensation the user is eligible to receive based on the entry in the database 515

Modify the user interface to display the computed amount of compensation 520

Receive a requested amount of compensation from the user via the user interface 525

In response to the requested amount of compensation less than the total amount of compensation, and in response to explicit confirmation from the user 530:

Execute a transfer of compensation to an account of the user 535

Modify the entry in the database associated with the user 540

FIG. 5

WORK TRACKING AND ADVANCES IN AN EMPLOYEE DATABASE SYSTEM

CROSS REFERENCE TO RELATED APPLICATIONS

This application is a continuation of U.S. application Ser. No. 16/426,669, filed May 30, 2019, now U.S. Pat. No. 11,257,169, which is incorporated by reference in its entirety.

BACKGROUND

This description generally relates to employee database systems, and specifically to identifying and presenting advance opportunities based on entries in an employee database.

Employees frequently request advances on uncompensated time from third-party entities because of 1) income volatility and misalignments between income and recurring bills, 2) a lack of savings and access to unearned wages, and 3) a lack of financial planning and budgeting. However, advances from third-party entities, particularly predatory payday lenders and loan sharks, bind employees to high interest rates and often exacerbate financial instability. Further, there is often an information gap between third-party entities and employee database systems that track the uncompensated time of employees. This allows employees to regularly overreport uncompensated time and owe more than they earn.

SUMMARY

A flexible advance system allows users who receive compensation through an employment database and compensation system to request and receive short-term advances in an amount equal to or less than to the uncompensated time earned within a time interval. An employment database and compensation system provides and manages compensation, benefits, and human resource management to employers with one or more employees. The flexible advance system processes advances such that short-term advances are recouped through a compensation deduction on the user's next regularly scheduled payday, which is managed by the employment database and compensation system. The flexible advance system does this by allowing users to adjust users' compensated wage amounts, time of payments, deductions, and payment route destinations. Because the flexible advance system has access to the compensation management of employers, the flexible advance system provides users financial support and privacy from the user's employers during advance requests and recoupment. The flexible advance system does this by receiving advance requests directly from users, adjusting repayment by underwriting the employers of the users, and by distributing recoupment directly through the employment database and compensation system. Further, the flexible advance system limits employer efforts and actions required to provide advances and displaces liability from employers and onto the flexible advance system by underwriting employers for advances.

The flexible advance system provides a user interface that allows users to request to receive compensation for a portion of time working during a time interval. The time interval ends before a subsequent date at which compensation for the time interval is scheduled to be distributed by an employer of the user through an employment database and compensation system, which can include the flexible advance system. In some embodiments, the user interface is only presented to users that are eligible to request advances, which may be based on user eligibility requirements and employer eligibility requirements.

Responsive to the request from the user, an entry in a database associated with the user is accessed. The entry in the database includes information representative of the total amount of uncompensated time worked by the user. For example, the information may include a status of the user (e.g., full-time, salaried, hourly), compensation rates (hourly wages, salary/time period, bonuses earned, etc.), liabilities and deductions, and the like. Based on this information, the flexible advance system computes a total amount of advance compensation available to the user in an advance request. The total amount of advance compensation may be representative of all or part of the total amount of compensation the user is predicted to have earned during the time interval.

The user interface is modified to display the total amount of advance compensation available to a user in an advance request. The user can request an amount of the available advance compensation using elements of the user interface. For example, the user may request all or a portion of this amount. If a user requests only a portion, the user may be eligible to request additional advances within the time interval based on the remaining amount of uncompensated time. In response to the requested amount being less than or equal to the total amount of available advance compensation available to a user in an advance request, the user can be prompted to explicitly confirm the compensation advance. If the user explicitly confirms the advance, a transfer of the requested amount of compensation is automatically executed from the flexible advance system to an account of the user before the subsequent date. The flexible advance system also modifies the entry in the database associated with the user by subtracting a compensated amount of time computed based on the advanced compensation from the total amount of uncompensated time.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
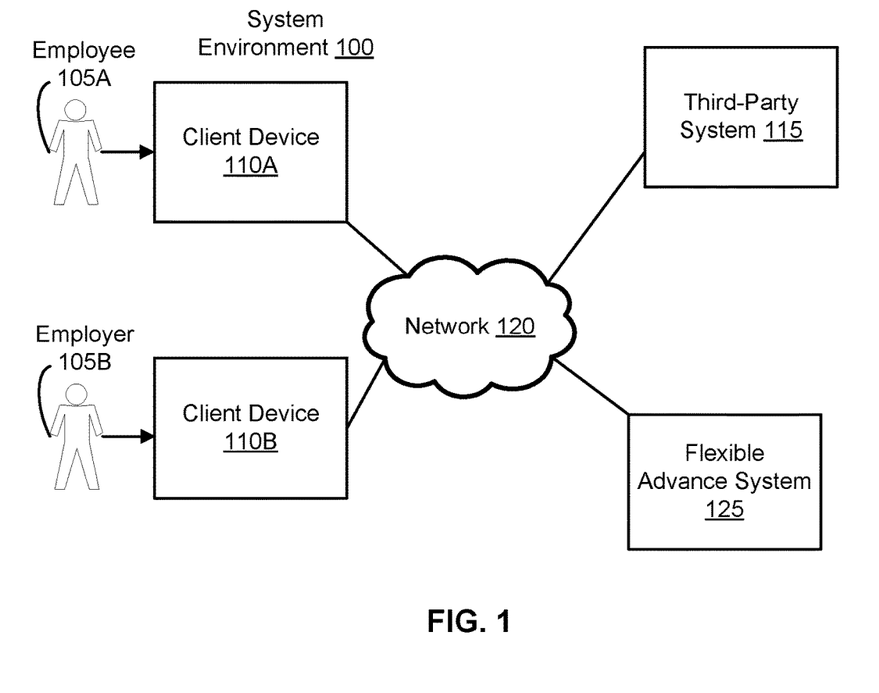
FIG. 1 illustrates a system environment of a flexible advance system, according to one embodiment.

FIG. 1 illustrates a system environment 100 of a flexible payment system 125, according to one embodiment. The system environment 100 shown in FIG. 1 includes an employee 105A, an employer 105B, client devices 110A-B, a third-party system 115, a network 120, and a flexible advance system 125. In alternative configurations, different and/or additional components may be included in the system environment 100.

Users of the flexible advance system 125 include employees, e.g., employee 105A. An employee 105A may use the flexible advance system to request advances associated with uncompensated work. Employees may request an advance through the flexible advance system 125 via a user interface on the client device 110A. An employer 105B of the employee 105A may access the flexible advance system 125 through an interface on a client device 110B.

The client devices 110A-B are computing devices capable of receiving user input as well as transmitting and/or receiving data via a network 120. In one embodiment, a client device is a conventional computer system, such as a desktop or a laptop computer. Alternatively, a client device may be a device having computer functionality, such as a personal digital assistant (PDA), a mobile telephone, a smartphone, or another suitable device. A client device is configured to communicate via the network 120. In one embodiment, a client device executes an application allowing a user of the client device to interact with the flexible advance system 125. For example, a client device executes a browser application or a native application to enable interaction between the client device and the flexible advance system 125 via the network 120. In another embodiment, a client device interacts with the flexible advance system 125 through an application programming interface (API) running on a native operating system of the client device, such as IOS® or ANDROID™.

The client devices 110A-B are configured to communicate via a network 120, which may include any combination of local area and/or wide area networks, using both wired and/or wireless communication systems. In one embodiment, a network 120 uses standard communications technologies and/or protocols. For example, a network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques.

The third-party system 115 can be associated with an accounting institution, a banking institution, a financial institution, an asset tracking or management institution, and the like. Users have one or more accounts with the third-party system 115. Through these accounts, users may receive advances from the flexible pay system 125, receive compensation from an employer, and pay a portion of the advance back to the flexible advance system 125. In some embodiments, users must have an account with a third-party system 115 to be eligible to receive advances from the flexible advance system 125. For example, users may be required to receive and/or pay off advances through a third-party system 115. It should be noted that in some embodiments, the entities associated with or responsible for the third-party system 115, the employer 105B, and the flexible advance system 125 are different and distinct entities. For instance, the flexible advance system 125 may be independently operated from the employer 105B and the third-party system 115, while still enabling communication between the employer and the third-party system.

The flexible advance system 125 provides advances to eligible employees associated with eligible organizations and/or employers. The flexible advance system 125 may determine the eligibility of users and/or employers using onboarding rules. For example, the user's eligibility may be based on the user's employment status, location, age, and history with previous advance requests. Further, the user's eligibility may also be based on the employer's number of employees, number of processed payrolls, number of employees, number of late payments, and the like. The system receives advance requests from eligible users through a user interface. The flexible advance system 125 determines how much compensation the user is eligible to receive based on the usage eligibility of the user, for example, based on the number of discrepancies between hours worked and reported during previous pay periods, the number of advance requests previously submitted within a period, and the like. The flexible advance system 125 processes and provides the advance to the user through an account of the third-party system 115 associated with the user.

The flexible advance system 125 also manages and distributes the recoupment of the advance, during which the flexible advance system 125 recovers the value of the advance from the employee. The flexible advance system 125 manages and distributes the recoupment of advance by updating the employer's payroll based on the value of the advance and any associated fees. For example, to update the employer's payroll, the flexible manage system 125 may deduct the amount of the advance from the employee's next regularly scheduled paycheck. The flexible advance system 125 may also distribute the recoupment of an advance over more than one paycheck to alleviate an employees' need for cash liquidity.

Flexible Advance System

The flexible advance system allows employees paid through an employment database and compensation system to request and receive advances. An employment database and compensation system provides and manages payroll, benefits, and human resource management to employers with one or more employees. An employer can have an account with the employment database and compensation system. Employer accounts include information about the employer's employees, payroll frequency and type, benefits plans, liabilities, deductions, and the like. Similarly, employees can have an account with the employment database and compensation system that includes information relating to payroll, benefits, liabilities, and deductions. Using this information, the employment database and compensation system processes payrolls for employers by determining a total amount of uncompensated time associated with an employee during a pay period, and determining a net compensation owed to the employee based on the uncompensated time and based on liabilities, benefits, and deductions associated with the user. The determined net compensation is then provided to the employee, for instance on a pay day, at regular intervals, and the like.

The amount of compensation an employee is eligible to receive in an advance is based on the amount of compensation earned up to time of the advance request, caps set by the flexible advance system and/or employer, caps set by the employee, state or local laws, a computed risk of lending to the user, and the like. In an advance request, an employee may request an advance amount that is less than or equal to the amount of compensation the user is eligible to receive. The employment database and compensation system recoups the advance amount through a wage deduction processed by the flexible advance system. In some embodiments, the employment database and compensation system is recouped in full on the date of the employee's next regularly scheduled payday. In other embodiments, the recoupment is distributed over more than one pay period, distributed according to a prearranged repayment schedule, and the like.

Since the flexible advance system is a part of a system that manages payrolls, the flexible advance system can provide employees privacy from employers by processing and distributing advances without the knowledge or input of the employer. This also provides the flexible advance system with historic time/work data of employees and employers that can be used to flag anomalies, displaces liability from employers and onto the flexible advance system by underwriting employers, facilitates the automation of advance requests through the use of information stored in employee and employer accounts, limits employer involvement in an employee's financials, limits employer efforts and actions required to provide advances, allows recoupment of advances to be distributed over multiple pay periods, allows the employment database and compensation system to provide financial advice to users that request advances, and provides a means with which employees can request advances from a device without having to interact with loan sharks/payday lenders and without having to provide collateral.

Figure 2:
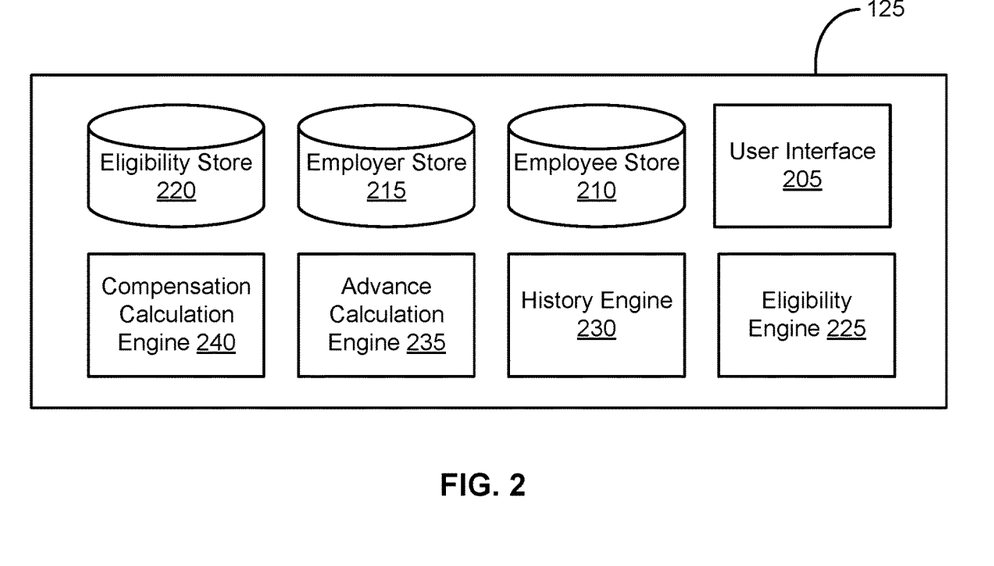
FIG. 2 is a block diagram of an architecture of the flexible advance system, according to one embodiment.

FIG. 2 is a block diagram of an architecture of the flexible advance system 125, according to one embodiment. The flexible advance system 125 shown in FIG. 2 includes a user interface 205, an employee store 210, an employer store 215, an eligibility store 220, an eligibility engine 225, a history engine 230, an advance calculation engine 235, and a compensation engine 240. In other embodiments, the flexible advance system 125 may include additional, fewer, or different components for various applications. Conventional components such as security functions, load balancers, failover servers, management and network operations consoles, and the like are not shown to not obscure the details of the system architecture.

The user interface 205 allows a user 105A to interact with the flexible advance system 125. Through various elements of the user interface 205 (such as graphical user interfaces displayed by a client device, communicative interfaces with other components described herein managed by the user interface, and the like), a user 105A can request an advance, input an amount of time worked, determine how much compensation they are eligible to receive in an advance request, select an advance amount, set up reminders for upcoming advance opportunities or payment reminders, set artificial caps on how much they can request in future advance requests, and the like.

The employee store 210 stores accounts for employees of employers. Each account has declarative information about an employee that was provided by the employee, employer, or third-party system 115. Information may include demographic information, employment history, compensation rates, payment history, employment state, aging balances, payment method (e.g., compensation through check or direct deposit), number of previous advance requests, user preference, and the like. User preferences may include caps set by the user and reminder preferences. Accounts may also be associated with eligibility information that is used by the flexible advance system 125 to determine the onboarding, usage, and/or offboarding (disqualification) eligibility of the user. Employee accounts may be updated and/or modified through the user interface 205 of the flexible advance system 125.

The employer store 215 stores accounts for employers. Information stored in an employer account of the employer store 215 may include employer location, number of payrolls, number of employees, status of employees (active, full-time, part-time, seasonal, inactive, etc.), pay history, number of bank errors, number of late payrolls, ability to run a payroll, ability to let admins cash out, caps limiting the amount employees can receive in an advance request, and the like. Accounts may also be associated with eligibility information associated with the employer. For example, an account of an employer may include information about the health of the employer (e.g., growth rate, number of employers, termination rates, etc.), employer preferences (e.g., number of payrollers per month), and whether an employer wants to let employees have access to the flexible advance system 125.

The eligibility store 220 stores rules for the eligibility of employees and employers during onboarding, usage, and offboarding. Onboarding eligibility relates to a set of rules that is used to determine the eligibility of a user to have access to the flexible advance system 125. For example, the set of rules for onboarding eligibility includes rules that are used to determine whether an employee can request advances with the flexible advance system 125. Onboarding eligibility rules may be based on employee work location, status (full-time, active, etc.), compensation, payment method (direct deposit versus check), age, state and local payment advance laws or regulations, and the like. Onboarding eligibility rules may also be based on employer location, number of payrolls, number of late payrolls, number of active employees, number of bank errors, ability to run payroll, type of payroll (e.g., 2-day payroll).

Usage eligibility rules relate to a set of rules used to determine the eligibility of a user during use of the flexible pay system 125. For example, the set of rules for usage eligibility may include rules that are used to determine how much compensation a user can request to receive in an advance request. Usage eligibility rules may be based on the number of reported hours, compensation received in previous pay periods, current balance owed to the flexible advance system 125, minimum advance request (e.g., $75), number of previous advances within a determined period (e.g., within a month, pay period, year, etc.), portion of accrued unpaid compensation, and the like.

Offboarding eligibility rules relates to a set of rules that are used to determine whether an employee and/or employer should be barred from accessing the flexible advance system 125. Rules for employee disqualification may be based on the number of overreported hours, status (e.g., retired, terminated), aging balances, changed payment method (e.g., from direct deposit to check), relocation (e.g., relocation to ineligible state), and the like. Rules for employer disqualification may be based on the location of the employer, number of bank errors, number of late payrolls, employer status (e.g., company suspension), termination rates, state and local payment advance laws and regulations, and the like.

The eligibility engine 225 uses the information in the employee store 210, employer store 215, and the eligibility rules stored in the eligibility store 220 to determine the eligibility of a user to use the flexible advance system 125 and/or request an advance. For example, the eligibility engine 225 may determine the eligibility of a user to use the flexible advance system 125 when the user attempts to create a profile with the flexible advance system 125. The eligibility engine 225 may also determine the eligibility of the user every time the user requests an advance. The eligibility engine 225 may also determine the eligibility of users when rules in the eligibility store 220 are updated. Similarly, the eligibility engine 225 may also determine the eligibility of users when employee and/or employer accounts are modified, created, or deleted.

The advance calculation engine 235 calculates an amount of compensation a user is eligible to receive in advance of an upcoming payroll. The amount of compensation the user is eligible to receive in an advance may be based, in part, on the history of the user during previous payrolls. For example, the advance calculation engine 235 predicts a net and gross income for the upcoming payroll based on information from previous pay periods. Information may include net and gross income, tax withholdings, liabilities, benefits, deductions, retirements and/or investment caps, Medicare and Social Security withholdings, and the like. For hourly workers, the total amount of compensation may also be based on the number of reported hours. The advance calculation engine 235 may also use user and/or employer behavior when calculating the total amount of compensation. User and/or employer behavior may include hours that were overreported, changes in termination rates of the employer, downward trends in compensation, expected bonuses, and changes in pay rates. Other information, including caps set by the flexible advance system and/or employer, caps set by the employee, state or local laws, a computed risk of lending to the user, and the like, may be also used by the advance calculation engine 235 when calculating the amount of compensation the user is eligible to receive.

The compensation calculation engine 240 determines how the advance will be recouped back to the lender (i.e., the flexible advance system 125 or employment database and compensation system). The compensation calculation engine 240 may also calculate interest rates and/or fees associated with the advance. Once an advance is processed, the compensation calculation engine 240 modifies a corresponding employer's payroll to reflect the recoupment distribution. The compensation calculation engine 240 may recoup the advance amount chronologically against the unpaid days. For example, if an employee is eligible to receive a $500 advance for ten unpaid days, but only requests $250 in advance pay, the $250 will only be recouped against the first five unpaid days (e.g., compensation corresponding to the first five unpaid days will be deducted from the amount allocated for distribution to the employee from the employer's payroll). The employee may then be able to receive an additional advance of $250 before a subsequent payroll.

The compensation engine 240 computes due dates for each loan day (day of advance request), as unpaid days (for which advance compensation is requested) may span multiple pay periods. Because of this, due dates for different loan days within a single advance request may be different. For a given loan day, the corresponding due date is the anticipated date of the payroll(s) associated with the advance. For example, an employee receives an advance of $120 for three unpaid days—the first two unpaid days are a part of a first payroll and the third unpaid day is a part of a second (and subsequent) payroll. In some embodiments, the compensation calculation engine 240 distributes the recoupment of the advance such that the employee recoups the flexible advance system 125 $80 on the date of the first payroll and $40 on the date of the second payroll. The compensation calculation engine 240 may automatically deduct the total advance amount from the appropriate payrolls of the employee. In other embodiments, the full advance amount is due on a single due date, a repayment plan is instituted, and the like.

If a user over-reports hours to the flexible advance system 125, then the user may be eligible to request an advance that results in overpayment. As a result, when the advance is recouped, the user's paycheck may not cover the entirety what the user owes. In some embodiments, the calculation engine 240 may automatically take the remainder of what the user owes from the account of the user in the third-party system 115. In other embodiments, the calculation engine 240 may deduct the remainder of what the user owes from a subsequent paycheck.

Figure 3A:
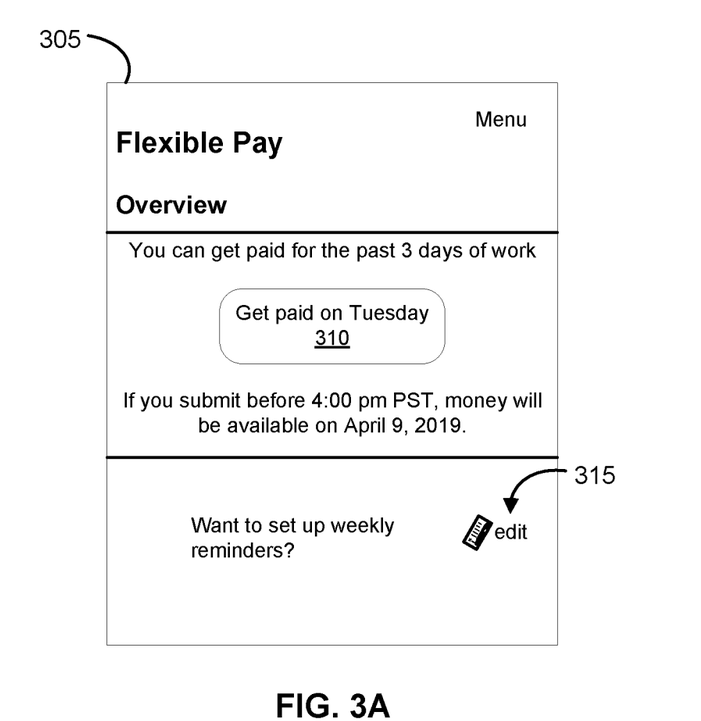
FIGS. 3A-3D illustrate the process of receiving and processing an advance request, according to one embodiment.

FIG. 3A illustrates an example homepage interface 305 of a flexible advance system 125. In some embodiments, to access a homepage interface 305, the user must login to a profile associated with the flexible advance system 125. Through the homepage interface 305, the user can initiate an advance request, change profile settings, view eligibility, and the like. Information that may be presented to a user in the homepage interface may include the number of unpaid days for which they can receive compensation, when they can receive the unpaid compensation, profile information (e.g., account identifiers, settings, etc.), and the like.

Users may initiate advance requests through an interface element of the homepage interface 305, e.g., start element 310. Users may also edit profile settings with a profile edit element, e.g., edit element 315. For example, a user may set up notifications to notify the user when they are eligible to initiate an advance request, reminders when an advance is due, notifications when an account balance is low. Users may also edit the frequency of notifications, reminders based on user preferences and eligibility rules, and set caps on the amount of compensation they can receive in an advance.

In some embodiments, users may only access the homepage interface 305 if they are eligible for onboarding. For example, a user may not be able to create or access an account with the flexible advance system 125 if they do not meet onboarding eligibility requirements. Examples of employee-side eligibility requirements may include: the user works and live in an eligible country/state, is fully onboarded and active, has an employee login, has a compensation with a positive wage, is paid with direct deposit, is of legal age, has received at least a threshold number of paychecks from the employer, has not received more than a threshold number of paychecks via check within a threshold period (e.g., one paycheck within the last year). The user's onboarding eligibility may also be based on the onboarding eligibility of the user's employer. For example, a user may be eligible if one or more of the following eligibility requirements are fulfilled by the user's employer: the employer operates in a supported country/state, the employer has run at least a threshold number of payrolls, the employer has no more than a threshold number of late payrolls, the employer has at least a threshold number of active employees, the employer has less than a threshold number of bank errors within a predetermined period (e.g., three bank errors within the last year), the employer can run a payroll, the employer does not allow admins to cash out, and the like.

Similarly, in some embodiments, the homepage interface 305 may only include a start element if users are eligible to initiate an advance request. For example, a user may be able to access the homepage interface 305 if they meet onboarding eligibility requirements even if they do not meet usage eligibility requirements. A user may be eligible to initiate an advance request if one or more of the following are fulfilled: the user has initiated less than a threshold number of advance requests within a period (e.g., two advances requests per month), the user has reimbursed the flexible advance system 125 for all previous advance requests in full, and the like. A user may be ineligible for usage if they have more than a threshold number of "strikes," are a part-time employee, have not recouped the flexible advance system 125 in full for past advances, etc.

Figure 3B:
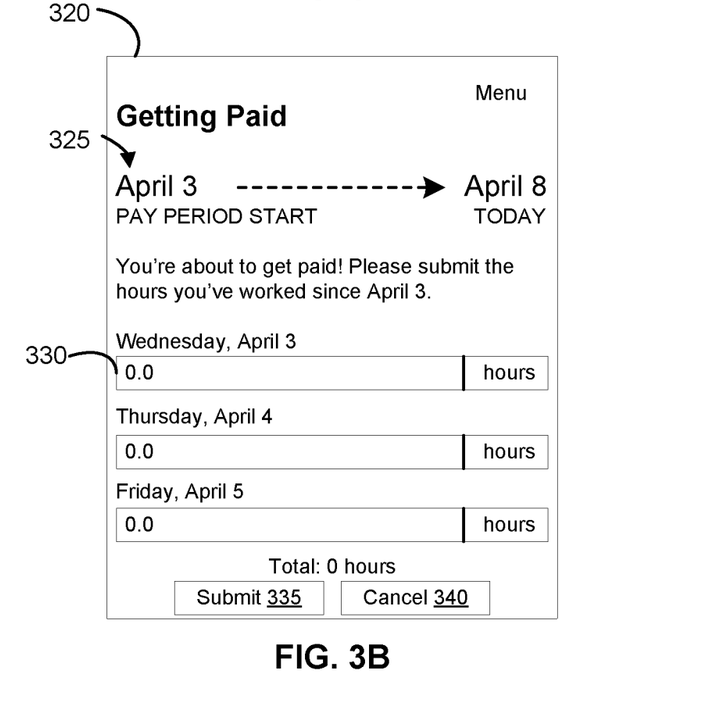

FIG. 3B illustrates an example hours input interface 320 of a flexible advance system 125. Calculations may vary for hourly and salaried employees. For example, for a salaried employee, the amount of compensation the user is eligible to receive in an advance will be based on the fixed compensation the employer receives each payroll. Alternatively, hourly employees submit the number of hours worked during a pay period on an interface of the flexible advance system 125. The amount of compensation the user is eligible to receive in an advance may be based on the number of reported hours, the pay rate for the hours (e.g., different rates for seasonal, overtime, vacation hours), and discrepancies between historical averages of reported hours and submitted hours for a current pay period. For example, if an employee worked, on average, forty hours a week over the last four pay periods, the total amount of compensation may be capped at forty hours.

In some embodiments, users that are compensated hourly need to report the number of hours they've worked during an interval between the start of a pay period and a date associated with the initiation of the advance request. To do this, users submit hours with varying levels of granularity via the hours input interface 320 (e.g., on a daily, weekly, or monthly basis). In some embodiments, users may also submit attributes of the hours that affect corresponding pay rates. For example, a user may label hours as seasonal, overtime, vacation, and the like.

The example hours input interface 320 shown includes a pay period information 335 and interface elements to input hours (input element 330), submit hours, (submit button 335), and cancel requests, (cancel button 340). Pay period information 335 includes information about the pay period the advance request is associated with. For example, the start and end dates of the pay period, current date, processing dates, expected advance delivery dates, and the like. Users input the number of hours they've worked during the interval in input elements, e.g., input element 330. The number of days for which a user can input hours corresponds to the number of days in the interval. Users submit hours through the submit button 335. Users may cancel an advance request using the cancel button 340. Other example interfaces may include elements that allow users to return to a previous webpage, return to a main menu, and the like.

Figure 3C:
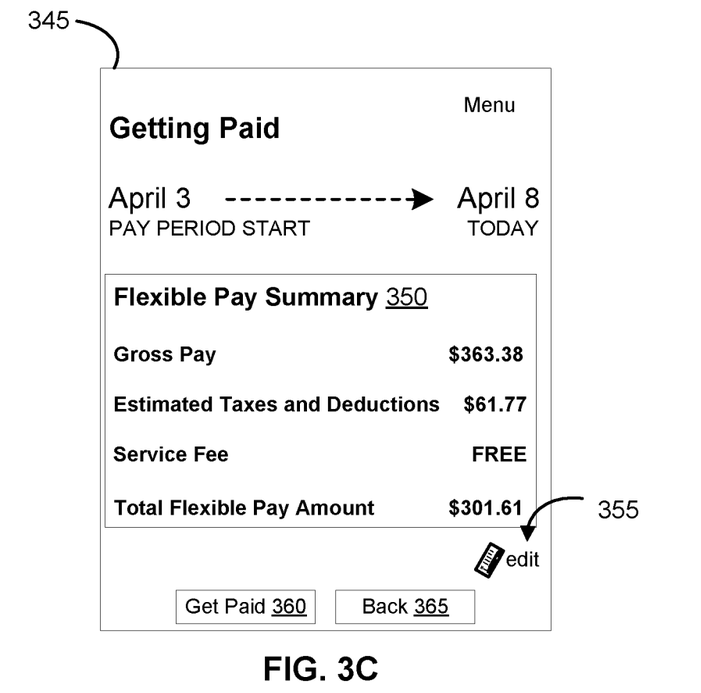

FIG. 3C illustrates an example advance summary interface 345 of a flexible advance system 125. In some embodiments, hourly employees are directed to the advance summary interface 345 after they submit hours in the hours input interface 320, and salaried workers are directed to the advance summary interface directly after initiating an advance request on the homepage interface 305.

Based on the number of hours submitted, any special attributes (holiday, overtime, vacation), and information in the employee store 210, employer store 215, and eligibility store 220, the flexible advance system 125 calculates the amount of compensation the user is eligible to receive. The amount of compensation the user is eligible to receive may be subject to general usage rules. For example, rules may be based on credit limits (e.g., 1.5 times the average of three most recent net pays up to a maximum amount), cash amount minimums (e.g., $75), fraction of accrued wages limits, reporting hour limits, caps set by the flexible advance system and/or employer, caps set by the employee, state or local laws, a computed risk of lending to the user, and the like. The amount of compensation the user is eligible to receive may also be subject to user-specific usage rules. For example, a user may only be allowed to report a number of hours corresponding to a maximum number of hours worked over a period. The amount of compensation the user is eligible to receive may further be based on any liabilities, benefits, deductions, etc., of the user.

The gross and net income associated with uncompensated time in the time interval is provided to the user in the advance summary interface 345. In the example embodiment shown, the advance summary interface 345 includes a flexible pay summary 350 and interface elements that allow the user to interact with and navigate the various interfaces of the flexible advance system 125. The flexible pay summary 350 summarizes the amount of compensation a user will receive in the advance request. Information may include gross pay, estimated taxes and deductions, service fees, and net pay (shown as total flexible amount). Examples of service fees may be calculated as flat fees and/or interest rates. For example, there may be a flat fee for processing the advance request and an interest rate based on the value of the advance (e.g., 1% of the received advance or $3 for each transaction, etc.).

The flexible pay summary 350 may provide the user with a maximum net amount the user can receive, a recommended net amount, or a net minimum amount. For example, a user may be able to take out a maximum of $1000, but based on the history of the user, the flexible advance system 125 recommends that the user only take out a portion of the maximum. The minimum amount may correspond to a minimum amount of compensation a user must receive to complete the transaction. For example, a user may have to receive a minimum of $75 for an advance request to be valid. In some embodiments, the flexible pay summary 350 may also include information explaining how the values in the flexible pay summary 350 were calculated. For example, how liabilities and deductions are factored into the net amount paid, what is a service fee, why there are discrepancies between the number of reported hours and the number of hours eligible to be compensated, and the like.

Users can edit the amount they receive in the advance using the edit button 355. In some embodiments, the user may be constrained to choose a value within a range. For example, users may not request more than the amount the flexible advance system 125 calculates as the maximum (e.g., less than 75% of their expected salary in an upcoming payroll). Similarly, a user may have to request at least a threshold amount (e.g., $75). Users may also be able to edit amounts withheld for taxes, deductions, benefits, and the like. For example, a user may be aware of a retirement cap that was reached for an account in a previous payroll and needs to reduce the amount of money allocated to that account in future payrolls. Users confirm the submission of the advance request through an element of the advance summary interface 345, e.g., get paid button 360. Users may return to a previous interface, cancel the request, return to a homepage, and the like through additional elements of the advance summary interface, e.g., back button 365.

Figure 3D:
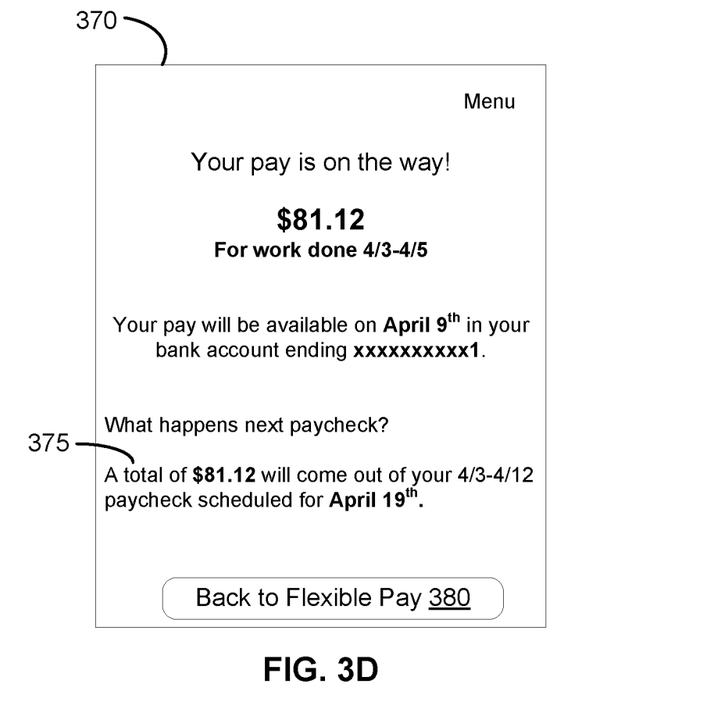

FIG. 3D illustrates an example receipt interface 370 of the flexible advance system 125. The receipt interface 370 shown is an example interface that may be presented to the user after an advance request is submitted. Information provided to the user in the receipt interface 370 may include the amount of compensation associated with the advance, when it will be available, the account it will be deposited into, and the like. The receipt interface 370 may also include recoupment information 375. Recoupment information 375 may include information explaining the amount that is owed and when it is owed. Information may further include when the user is eligible to initiate an additional request, if the user is eligible to request future advances, account balances, etc. Through elements of the receipt interface 370, e.g., element 380, the user may be redirected to a homepage interface or profile interface that allows the user to view summaries of past transactions, the user's profile, eligibility, and the like.

Figure 4:
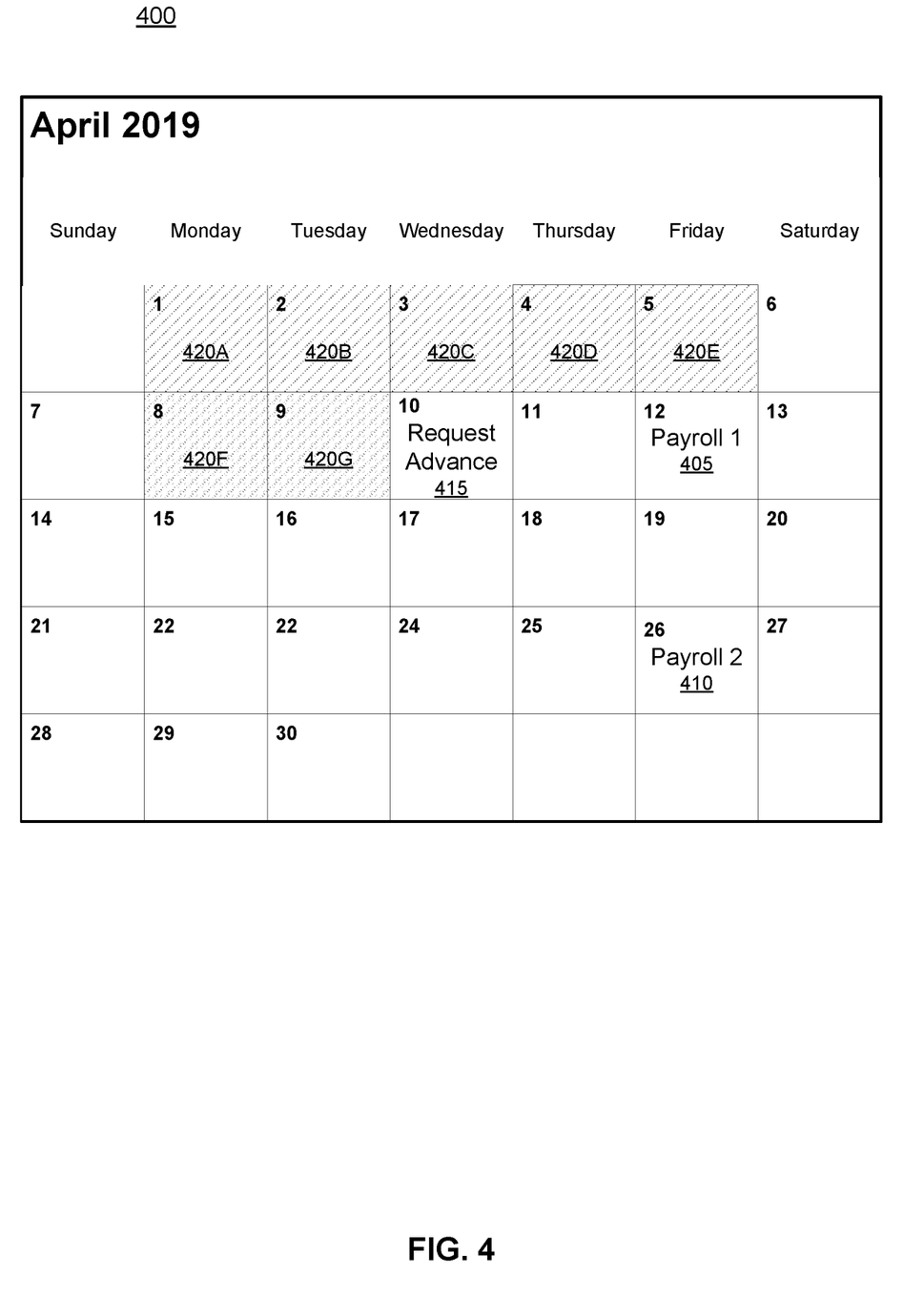
FIG. 4 illustrates an example of receiving and redeeming an advance request, according to one embodiment.

FIG. 4 illustrates example timelines 400 of providing and recouping advances, according to one embodiment. The flexible advance system 125 distributes due dates of an advance request based on the amount received during the advance, the time interval associated with the advance, the number of pay periods associated with the advance, the payroll frequency of the user's employer, and the like. The flexible advance system 125 may distribute the recoupment such that the user's financial liquidity is not hindered too greatly during any given pay period. Alternatively, the flexible advance system 125 may distribute the recoupment of the advance such that the user pays the funds back in full and reduces interest owed.

The user may request an advance amount that is equal to or less than the amount of compensation the user is eligible to receive. For example, a user may be eligible to receive compensation for days 420A-420E, represented with strips (e.g., $1000), but only requests to receive compensation equal to the amount earned during days 420A-420C (e.g., $500). The amount requested in the advance will only be recouped against the first three unpaid days (e.g., 420A, 420B, 420C) of the pay period. The employee may then be able to use the remaining $500 to redeem in the future. For example, the user can request another advance any time before the first payroll, Payroll 1 405, for additional uncompensated time associated with the first payroll.

The user may request an advance amount that is equal to the maximum amount the user is eligible to receive, i.e., the amount of compensation the user is eligible to receive. For example, if a user is paid bi-weekly, the user will be compensated by the employer on the $12^{th}$ for work completed the week of the $1^{st}$, corresponding to days 420A-420E. Similarly, the user will be compensated for work completed the weeks of the $8^{th}$ and $15^{th}$ on the $26^{th}$, i.e., the day of Payroll 2 410. When a user initiates an advance request 415 on the $10^{th}$ and request the total amount of compensation, flexible advance system 125 will recoup the advance in full on the $12^{th}$, i.e., on the day of Payroll 1 405. Based on the pay period and payrolls of the user's employer, the user may not be able to request additional advances associated with the time interval of Payroll 1 405.

The uncompensated days associated with a request may correspond to a single pay period. For example, based on an employer's pay schedule, a user may be compensated on the $12^{th}$ for work completed during the weeks of the $1^{st}$ and the $8^{th}$. The user may initiate an advance request 415 on the $10^{th}$ to be compensated for days 420A-420G. In some embodiments, the entire amount of the advance will be deducted from the compensation the user receives on the $12^{th}$, e.g., Payroll 1 405. This is because the advance will be recouped against days associated with a single pay period. In other embodiments, the flexible advance system 125 may include payment plans that distribute the funds owed over a period.

The user may request an advance that is associated with more than one pay period or more than one payroll. For example, a user may initiate an advance request 415 for work completed April $1^{st}$ through April $9^{th}$ (e.g., days 420A-420G). Based on the user's employer's payroll schedule, the user will be compensated for the work completed during the week of the $1^{st}$ through the $5^{th}$ on the $12^{th}$. This will be paid during Payroll 1 405. The user will be compensated for the work completed during the week of the $8^{th}$ during Payroll 2 410. Therefore, the uncompensated days associated with the advance request 415 are associated with two payrolls, Payroll 1 405 and Payroll 2 410. Because the uncompensated days are associated with more than one payroll, the flexible advance system 125 will recoup a first portion of the advance on the $12^{th}$ (e.g., Payroll 1 405) and a second portion of the advance on the $26^{th}$ (e.g., Payroll 2 410). The first portion of the advance is recouped against the days associated with the Payroll 1 405, days 420A-420E. The second portion of the advance is recouped against the days associated with Payroll 2 410, days 420F-420G, represented with crosses. This provides user flexibility when requesting and paying back advances.

Figure 5:
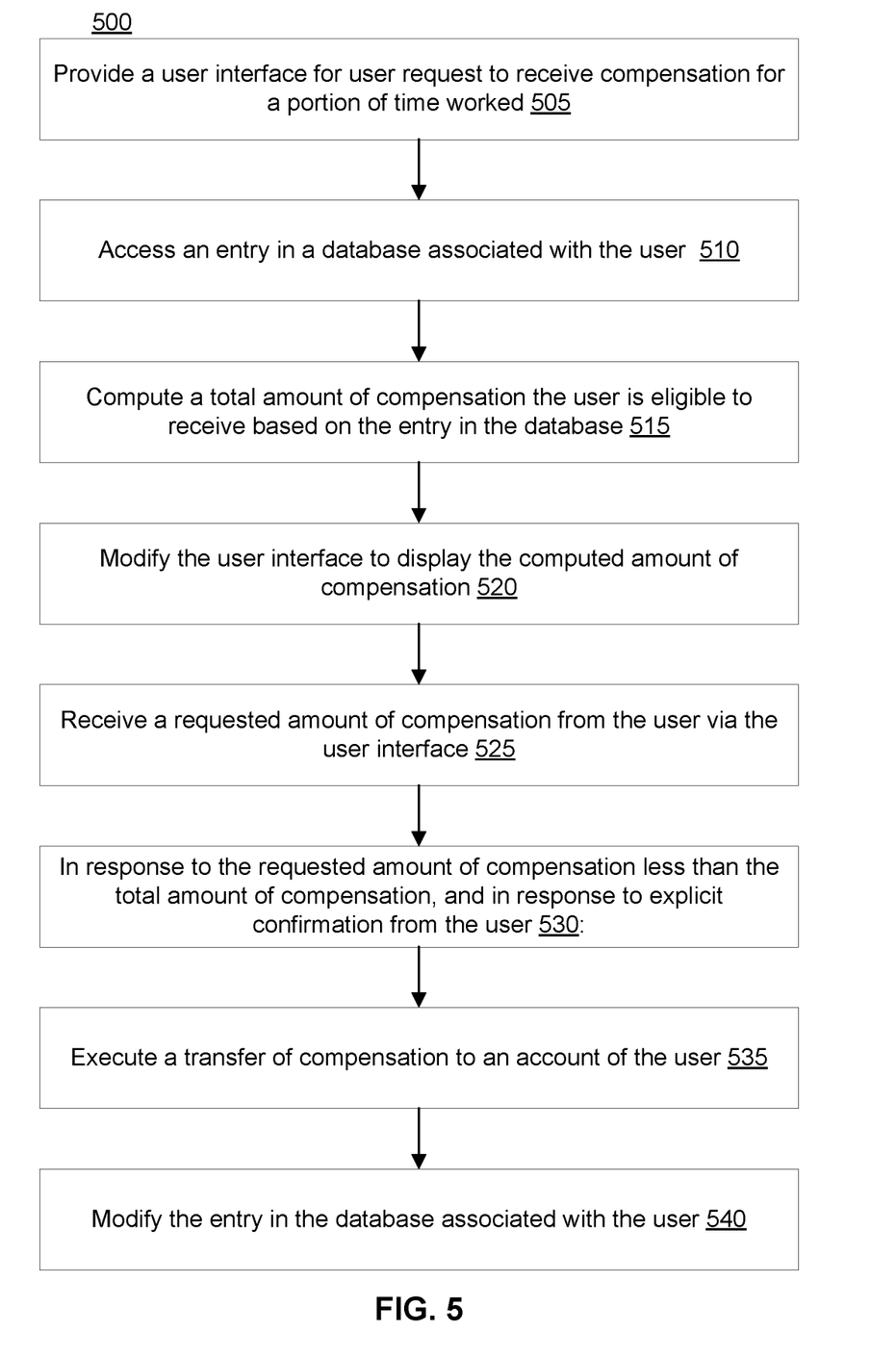
FIG. 5 is a flow chart illustrating a method of receiving and processing an advance request, according to one embodiment.

FIG. 5 is a flow chart illustrating a method 500 of receiving and processing an advance request, according to one embodiment. A user interface is provided 505 in which a user can request to receive compensation for a portion of time worked during a time interval before a subsequent date. For example, a time after a previous payroll and a current date. An entry in a database associated with the user is accessed 510. In some embodiments, the user interface may include a user interface element in which the user may input the amount of time worked during the time interval.

An amount of compensation the user is eligible to receive is computed 515 based on the entry in the database. In some embodiments, the amount of compensation the user is eligible to receive is computed, in part, by estimating one or more tax liabilities or deductions associated with the total compensation, and one or more benefits associated with the user. The tax liabilities, deductions and/or benefits may be estimated based on those associated with a preceding time interval. The user interface is modified 520 to display the computed amount. In some embodiments, the total compensation the user is eligible to receive is computed by accessing an amount of time worked by the user during the time interval, accessing an amount of time reported by the user during the time interval, and computing the total amount of compensation the user is eligible to receive based on the amount of time worked by the user, the amount of time reported by the user, and data of the entry associated with the user. For example, if the user overreported hours (e.g., reported forty hours, but only works thirty hours), and the user has a history of over reporting hours, the user may only be eligible to receive compensation associated with thirty hours of work.

A requested amount of compensation from the user is received 525 via the user interface. In response to the requested amount of compensation being less than the total amount of compensation, and in response to explicit confirmation from the user 530, a transfer of compensation from the online system to an account of the user is executed 535 before the subsequent date. The entry in the database associated with the user is modified 540. In some embodiments, the entry in the database is modified by subtracting a portion of the compensated time from the total amount of uncompensated time associated with the subsequent date (e.g., a first payroll). An additional portion of the compensated time is subtracted from the total amount of uncompensated time associated with a date after the subsequent date (e.g., a second payroll). In some embodiments, a transfer of an amount of capital from the account associated with the user to the online system on the subsequent date is executing. The amount of capital may be based on the compensation transferred from the online system to the account of the user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
providing, by an online system, for display a user interface by an application on a client device in which a user can request to receive compensation for a portion of time worked during a time interval before a subsequent date at which compensation for the time interval is scheduled to be distributed by an employer of the user;
responsive to a request from the user, accessing an entry in a database associated with the user and including information representative of a total amount of uncompensated time worked by the user;
computing a total amount of compensation the user is eligible to receive based on 1) an amount of time recorded as worked by the user during the time interval, 2) an amount of time reported but not recorded as worked by the user during the time interval, and 3) wage information associated with the user;
modifying the user interface to display the computed amount of compensation;
receiving a requested amount of compensation from the user via the user interface; and
in response to 1) the user not having previously improperly requested advance compensation more than a threshold number of times, 2) the requested amount of compensation being less than the total amount of compensation, 3) the amount of time reported but not recorded as worked by the user not exceeding a historical average for the user, and 4) explicit confirmation from the user, automatically:
executing a transfer of compensation from the online system to an account of the user before the subsequent date; and
modifying the entry in the database associated with the user by subtracting a compensated amount of time determined based on the requested amount of compensation from the total amount of uncompensated time.

2. The method of claim 1, wherein computing the total amount of compensation the user is eligible to receive further comprises:
estimating one or more tax liabilities associated with the total amount of compensation;
estimating one or more benefits associated with the user; and
computing the total amount of compensation the user is eligible to receive based on the total amount of uncompensated time, the estimated one or more tax liabilities, and the estimated one or more benefits.

3. The method of claim 2, wherein the one or more tax liabilities are estimated based on one or more tax liabilities associated with a preceding time interval, and wherein the one or more benefits are estimated based on one or more benefits associated with the preceding time interval.

4. The method of claim 1, further comprising:
providing a user element of the user interface in which the user inputs an amount of time worked during the time interval before the subsequent date; and
receiving input from the user indicating the amount of time worked during the time interval before the subsequent date.

5. The method of claim 1, wherein the subsequent date is a first date and wherein modifying the entry in the database further comprises:
subtracting a portion of the compensated time from the total amount of uncompensated time associated with the first date; and
subtracting an additional portion of the compensated time from a total amount of uncompensated time associated with a second date, wherein the second date is after the first date.

6. The method of claim 1, further comprising:
executing a transfer of an amount of capital from the account associated with the user to the online system on the subsequent date, wherein the amount of capital is based on the compensation transferred from the online system to the account of the user.

7. The method of claim 1, wherein the user interface is provided for display in response to determining that the employee is eligible for advance compensation based on one or more of: a geographic location of the user, an employee status of the user, an age of the user, or a net compensation of the user.

8. The method of claim 1, wherein the user interface is provided for display in response to determining that the employer is eligible to provide advance compensation based on one or more of: a geographic location of the employer, a number of employees of the employer, or a number of payrolls of the employer.

9. A non-transitory computer-readable storage medium containing computer program code that, when executed by a hardware processor, causes the hardware processor to perform steps comprising:
providing, by an online system, for display a user interface by an application on a client device in which a user can request to receive compensation for a portion of time worked during a time interval before a subsequent date at which compensation for the time interval is scheduled to be distributed by an employer of the user;
responsive to a request from the user, accessing an entry in a database associated with the user and including information representative of a total amount of uncompensated time worked by the user;
computing a total amount of compensation the user is eligible to receive based on 1) an amount of time recorded as worked by the user during the time interval, 2) an amount of time reported but not recorded as worked by the user during the time interval, and 3) wage information associated with the user;
modifying the user interface to display the computed amount of compensation;
receiving a requested amount of compensation from the user via the user interface; and
in response to 1) the user not having previously improperly requested advance compensation more than a threshold number of times, 2) the requested amount of compensation being less than the total amount of compensation, 3) the amount of time reported but not recorded as worked by the user not exceeding a historical average for the user, and 4) explicit confirmation from the user, automatically:
executing a transfer of compensation from the online system to an account of the user before the subsequent date; and
modifying the entry in the database associated with the user by subtracting a compensated amount of time determined based on the requested amount of compensation from the total amount of uncompensated time.

10. The non-transitory computer-readable storage medium of claim 9, wherein computing the total amount of compensation the user is eligible to receive further comprises:
estimating one or more tax liabilities associated with the total amount of compensation;
estimating one or more benefits associated with the user; and
computing the total amount of compensation the user is eligible to receive based on the total amount of uncompensated time, the estimated one or more tax liabilities, and the estimated one or more benefits.

11. The non-transitory computer-readable storage medium of claim 10, wherein the one or more tax liabilities are estimated based on one or more tax liabilities associated with a preceding time interval, and wherein the one or more benefits are estimated based on one or more benefits associated with the preceding time interval.

12. The non-transitory computer-readable storage medium of claim 9, wherein the program code, when executed by the hardware processor, causes the hardware processor to perform further steps comprising:
providing a user element of the user interface in which the user inputs an amount of time worked during the time interval before the subsequent date; and
receiving input from the user indicating the amount of time worked during the time interval before the subsequent date.

13. The non-transitory computer-readable storage medium of claim 9, wherein the subsequent date is a first date and wherein modifying the entry in the database further comprises:
subtracting a portion of the compensated time from the total amount of uncompensated time associated with the first date; and
subtracting an additional portion of the compensated time from a total amount of uncompensated time associated with a second date, wherein the second date is after the first date.

14. The non-transitory computer-readable storage medium of claim 9, wherein the program code, when executed by the hardware processor, causes the hardware processor to perform further steps comprising:
executing a transfer of an amount of capital from the account associated with the user to the online system on the subsequent date, wherein the amount of capital is based on the compensation transferred from the online system to the account of the user.

15. The non-transitory computer-readable storage medium of claim 9, wherein the user interface is provided for display in response to determining that the employee is eligible for advance compensation based on one or more of: a geographic location of the user, an employee status of the user, an age of the user, or a net compensation of the user.

16. The non-transitory computer-readable storage medium of claim 9, wherein the user interface is provided for display in response to determining that the employer is eligible to provide advance compensation based on one or more of: a geographic location of the employer, a number of employees of the employer, or a number of payrolls of the employer.

17. A system comprising:

a hardware processor; and a non-transitory computer-readable medium containing instructions that, when executed by the hardware processor, cause the hardware processor to:

provide, by an online system, for display a user interface by an application on a client device in which a user can request to receive compensation for a portion of time worked during a time interval before a subsequent date at which compensation for the time interval is scheduled to be distributed by an employer of the user;

responsive to a request from the user, access an entry in a database associated with the user and including information representative of a total amount of uncompensated time worked by the user;

compute a total amount of compensation the user is eligible to receive based on 1) an amount of time recorded as worked by the user during the time interval, 2) an amount of time reported but not recorded as worked by the user during the time interval, and 3) wage information associated with the user;

modify the user interface to display the computed amount of compensation;

receive a requested amount of compensation from the user via the user interface; and in response to 1) the user not having previously improperly requested advance compensation more than a threshold number of times, 2) the requested amount of compensation being less than the total amount of compensation, 3) the amount of time reported but not recorded as worked by the user not exceeding a historical average for the user, and 4) explicit confirmation from the user, automatically:

execute a transfer of compensation from the online system to an account of the user before the subsequent date; and modify the entry in the database associated with the user by subtracting a compensated amount of time determined based on the requested amount of compensation from the total amount of uncompensated time.

18. The system of claim 17, wherein the subsequent date is a first date and wherein modifying the entry in the database further comprises:

subtracting a portion of the compensated time from the total amount of uncompensated time associated with the first date; and subtracting an additional portion of the compensated time from a total amount of uncompensated time associated with a second date, wherein the second date is after the first date.

19. The system of claim 18, further containing instructions that cause the hardware processor to:

execute a transfer of an amount of capital from the account associated with the user to the online system on the subsequent date, wherein the amount of capital is based on the compensation transferred from the online system to the account of the user.

20. The system of claim 17, wherein the user interface is provided for display in response to determining that the employee is eligible for advance compensation based on one or more of: a geographic location of the user, an employee status of the user, an age of the user, or a net compensation of the user.

* * * * *